US012536179B2

(12) United States Patent
Masiero et al.

(10) Patent No.: US 12,536,179 B2
(45) Date of Patent: Jan. 27, 2026

(54) SYSTEM AND METHOD FOR MANAGING EVENTS (71) Applicant: ADP, Inc., Roseland, NJ (US)

(72) Inventors: Roberto A. Masiero, Basking Ridge, NJ (US); Jigesh Saheba, Alpharetta, GA (US); Umakant Saraswat, Clifton, NJ (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/362,830

(22) Filed: Jul. 31, 2023

(65) Prior Publication Data
US 2023/0410059 A1    Dec. 21, 2023

Related U.S. Application Data (60) Continuation of application No. 17/217,100, filed on Mar. 30, 2021, now Pat. No. 11,727,361, which is a division of application No. 14/802,336, filed on Jul. 17, 2015, now Pat. No. 11,030,584.

(51) Int. Cl.
*G06Q 10/0631* (2023.01)
*G06F 16/2455* (2019.01)
*G06Q 10/109* (2023.01)
*G06Q 10/1093* (2023.01)

(52) U.S. Cl.
CPC .. *G06F 16/24568* (2019.01); *G06Q 10/06311* (2013.01); *G06Q 10/109* (2013.01); *G06Q 10/1093* (2013.01)

(58) Field of Classification Search
CPC ......... G06Q 10/1095; G06Q 10/06311; G06Q 10/109; G06Q 10/1093; G06F 16/24568
See application file for complete search history.

(56) References Cited

U.S. PATENT DOCUMENTS

| 7,747,458 B2 * | 6/2010 | Lyle | G06Q 10/1093 705/7.19 |
| 8,887,286 B2 | 11/2014 | Dupont et al. | |
| 2002/0099579 A1 | 7/2002 | Stowell et al. | |
| 2002/0099598 A1 | 7/2002 | Eicher, Jr. et al. | |
| 2003/0033179 A1 * | 2/2003 | Katz | G06Q 10/0631 705/7.41 |
| 2003/0149714 A1 * | 8/2003 | Casati | G06Q 10/10 718/100 |

(Continued)

OTHER PUBLICATIONS

Hasan, Khandaker Tabin et al. The History of Temporal Data Visualization and a Proposed Event Centric Timeline Visualization Model. International Journal of Computer Applications 70.27 Foundation of Computer Science. (2013).*

(Continued)

*Primary Examiner* — Timothy Padot
(74) *Attorney, Agent, or Firm* — Foley & Lardner LLP (57) ABSTRACT

A method and apparatus for managing events. A stream of event data for a plurality of events corresponding to an entity is received. A timeline for the plurality of events is generated based on the stream of the event data. A set of event chains is identified based on the timeline, the event data, and a set of policies. A trigger related to an event belonging to an event chain of the set of event chains is detected. A number of effects of the trigger is identified in which the number of effects includes at least one of a number of insights, a number of actions, or a number of opportunities.

16 Claims, 9 Drawing Sheets

(56) References Cited

U.S. PATENT DOCUMENTS

| | | | |
|---|---|---|---|
| 2008/0127231 A1* | 5/2008 | Shaffer | G06Q 10/109 715/764 |
| 2012/0259842 A1* | 10/2012 | Oman | G06Q 10/1093 707/758 |
| 2012/0271676 A1* | 10/2012 | Aravamudan | G06Q 10/1093 705/7.18 |
| 2012/0331378 A1* | 12/2012 | Baioura | G06Q 10/109 715/243 |
| 2013/0297477 A1 | 11/2013 | Overman et al. | |
| 2014/0129559 A1* | 5/2014 | Estes | G06Q 10/10 707/737 |
| 2014/0250052 A1* | 9/2014 | Lospinoso | G06Q 30/0201 706/59 |
| 2015/0370421 A1* | 12/2015 | Joshi | H04L 67/02 715/739 |
| 2016/0179979 A1* | 6/2016 | Aasman | G06F 16/24532 707/603 |
| 2017/0017929 A1 | 1/2017 | Masiero et al. | |

OTHER PUBLICATIONS

M. VanDaniker, "Visualizing real-time and archived traffic incident data," 2009 IEEE International Conference on Information Reuse & Integration, Las Vegas, NV, USA, 2009, pp. 206-211.*

HandySoft Announces BizFlow{R) 11, BPM Industry's First Solution To Embed the Value of Process into the Core Fabric of Daily Work. Business Wire Oct. 17, 2007: NA.

US Notice of Allowance issued in corresponding U.S. Appl. No. 14/802,336, dated Feb. 4, 2021 (14 pages).

US Notice of Allowance issued in corresponding U.S. Appl. No. 17/217,100, dated Mar. 30, 2023 (12 pages).

US Office Action issued in corresponding U.S. Appl. No. 14/802,336, dated Aug. 16, 2018 (24 pages).

US Office Action issued in corresponding U.S. Appl. No. 14/802,336, dated Aug. 20, 2019 (31 pages).

US Office Action issued in corresponding U.S. Appl. No. 14/802,336, dated Jan. 7, 2020 (40 pages).

US Office Action issued in corresponding U.S. Appl. No. 14/802,336, dated Jun. 23, 2020 (21 pages).

US Office Action issued in corresponding U.S. Appl. No. 14/802,336, dated Mar. 1, 2019 (30 pages).

US Office Action issued in corresponding U.S. Appl. No. 17/217,100, dated Jan. 17, 2023 (12 pages).

US Office Action issued in corresponding U.S. Appl. No. 17/217,100, dated Nov. 22, 2022. (28 pages).

Visual Communications. Anonymous. The Practical Accountant, suppl. CPA Wealth Provider: 4. SourceMedia. (Jan. 2005).

* cited by examiner

SYSTEM AND METHOD FOR MANAGING EVENTS

CROSS-REFERENCE TO RELATED APPLICATION

This application claims the benefit of, and priority to, under 35 U.S.C. § 120 as continuation of U.S. patent application Ser. No. 17/217,100, filed Mar. 30, 2021, which is a divisional of and claims the benefit of priority under 35 U.S.C. § 121 to U.S. patent application Ser. No. 14/802,336, filed Jul. 17, 2015, the entire contents of each of which are incorporated herein by reference.

BACKGROUND INFORMATION

1. Field

The present disclosure relates generally to digital events and, in particular, to managing digital events. Still more particularly, the present disclosure relates to a method and apparatus for managing the effects of certain triggers on other digital events in an event chain.

2. Background

An event may be a thing that happens or occurs and may take many different forms. For example, without limitation, an event may be an employee arriving late, a dentist appointment, a flight, a deposit of money into a checking account, performance of a task, an alert message, the lapse of a timer, or some other type of event.

Oftentimes, the occurrence of an event, which may be referred to as a trigger, has consequences that affect other events. These types of triggers may cause a chain of effects. For example, changing a time of a dentist appointment may mean that a babysitter needs to be rescheduled. A member of a team who arrives late to an event may affect the ability of other members on that team to perform certain tasks. As another example, when an employee signs up for a project at work, the employee may then need to obtain a corresponding type of training in order to be able to participate in the project. Further, an information packet for the project may need to be sent to the employee. In this manner, different types of triggers may have different effects.

With the advent of the Internet age and machines becoming increasingly intelligent, machines are capable of not only generating events, but also responding to events. For example, when a refrigerator detects that there is no more milk, this detection is recorded as a digital event. This digital event may trigger another digital event, such as the sending of a message to the owner of the refrigerator to get more milk, the generation of an order to have more milk made, or the generation of an order to have more milk delivered.

Currently, many different types of time management software programs, web applications, and mobile apps are available for tracking events. These types of services are able to store information about events and provide notifications for events that are about to occur.

However, some of these currently available services are unable to take into account the intricacies of chained effects of a trigger, such as an occurrence of an event or a change to an event. For example, these services may be unable to determine how a change to the time or location of one event may affect multiple other events.

As one specific example, a change to the location of a meeting may affect a person's ability to make it to the location of a second meeting on time due to an increased distance between the two locations of the two meetings. This delay, in turn, may require that a new meeting be scheduled, which may, in turn, require that meeting cancellation notices and rescheduling notices be sent out to certain people.

Further, currently available services may be unable to systematically show and link past and future events that are relevant to an entity in a manner that would allow for more effective management of events for the entity. Therefore, it would be desirable to have a method and apparatus that take into account at least some of the issues discussed above, as well as other possible issues.

SUMMARY

In one illustrative embodiment, a method is provided for managing events. A stream of event data for a plurality of events corresponding to an entity is received. A timeline for the plurality of events is generated based on the stream of the event data. A set of event chains is identified based on the timeline, the event data, and a set of policies. A trigger related to an event belonging to an event chain of the set of event chains is detected. A number of effects of the trigger is identified in which the number of effects includes at least one of a number of insights, a number of actions, or a number of opportunities.

In another illustrative embodiment, an apparatus comprises a data storage and an event manager in communication with the data storage. The data storage is for storing information about a plurality of events corresponding to an entity. The event manager receives a stream of event data for the plurality of events and processes and stores the event data in the data storage. The event manager generates a timeline for the plurality of events based on the stream of the event data and identifies a set of event chains based on the timeline, the event data, and a set of policies. Further, the event manager detects a trigger related to an event belonging to an event chain of the set of event chains and identifies a number of effects of the trigger.

In yet another illustrative embodiment, an event management system comprises a data storage, an event manager in communication with the data storage, and a display system. The data storage is for storing information about a plurality of events corresponding to an employer entity. The event manager receives a stream of event data for the plurality of events and processes and stores the event data in the data storage. The event manager generates a timeline for the plurality of events based on the stream of the event data and identifies a set of event chains based on the timeline, the event data, and a set of policies. Further, the event manager detects a trigger related to an event belonging to an event chain of the set of event chains and identifies a number of effects of the trigger. The display system is for displaying a graphical user interface. The event manager displays a set of outputs in the graphical user interface based on the number of effects identified.

In another illustrative example, a method is provided for managing events related to an entity. An asynchronous stream of unprocessed event data related to the entity may be received. Event data for a plurality of events, a timeline corresponding to the plurality of events, and a set of event chains are updated based on processing of the unprocessed event data. Current state information is identified. A determination is made as to whether a trigger related to at least one event belonging to an event chain of the set of event chains has occurred based on at least one of the event data, the timeline, the set of event chains, or the current state information. A number of effects of the trigger are identified in response to a determination that the trigger has occurred. The number of effects is visually presented to a user in a graphical user interface.

In yet another illustrative embodiment, a method is provided for managing events. An occurrence of a trigger related to an event belonging to an event chain may be detected. A chain of effects of the trigger is identified in response to a determination that the trigger has occurred. The chain of effects is visually presented to a user in a graphical user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a system and method capable of managing events and the effects of certain triggers on a chain of linked events.

As events occur, it may be desirable to have a system and method capable of generating insights, suggesting potential actions or identifying potential opportunities for an entity. An entity may be an individual, a machine, or an organization. Based on past events, machine learning mechanism may be put in place to identify potential patterns. For example, as events occur, multiple potential patterns may emerge and multiple hypotheses will be tested against actual events. Based on testing, the most likely hypothesis will be selected as the pattern for generating insights, suggesting potential actions, or identifying potential opportunities.

The multiple hypotheses will continue to be updated and tested based on actual data. When appropriate, user input may be necessary to select the best pattern. In such case, multiple potential patterns will be presented to the user to select the best one.

Having past and future events displayed along a timeline or on a calendar may be an effective way in communicating a coherent linkage on the past and future events, allowing the user to gain additional insight based on the observation. Particularly, when using a filter, a past and future events timeline or calendar can help a user to zero in on particular chains of events or events in a particular subject.

Figure 1:
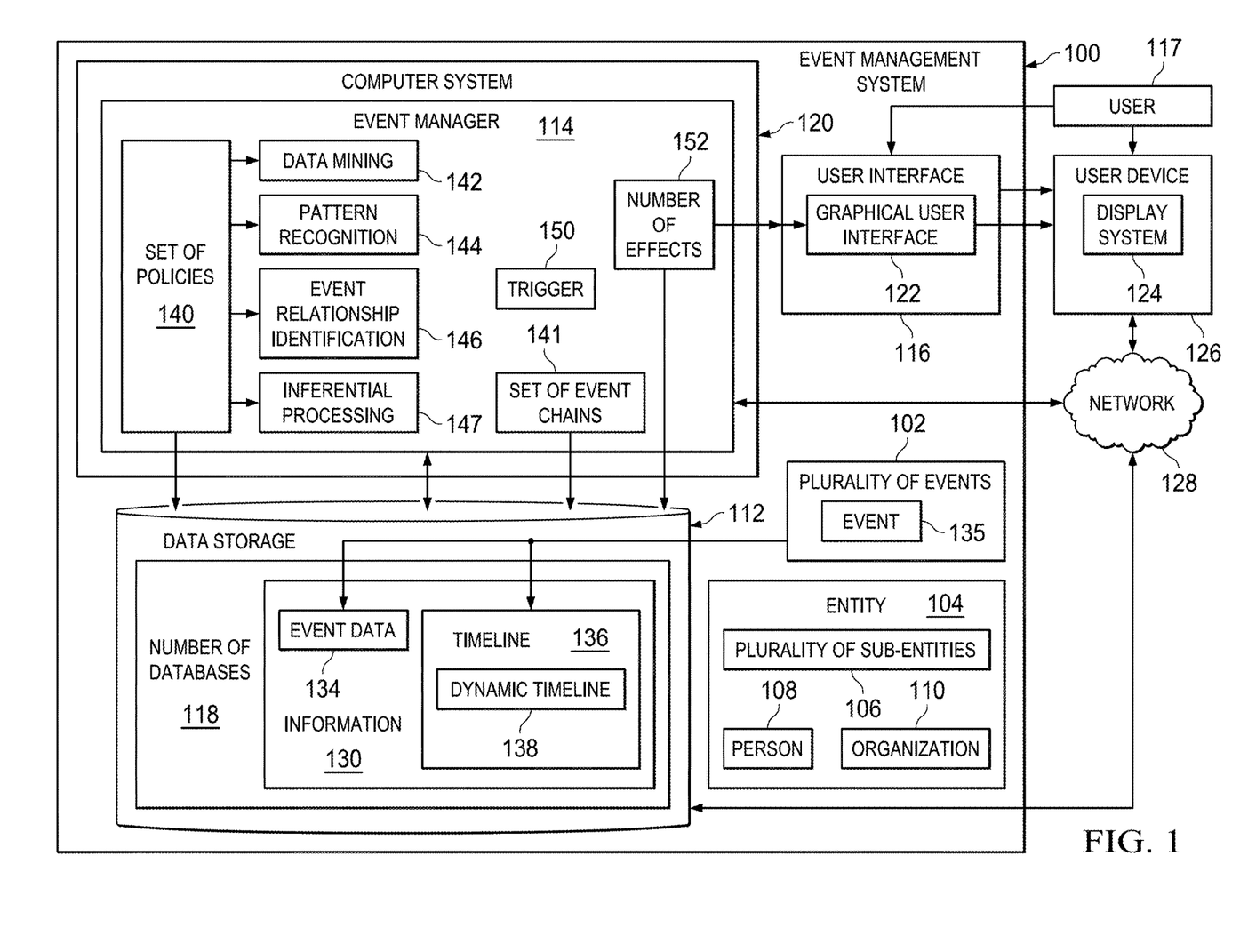
FIG. 1 is an illustration of an event management system in the form of a block diagram in accordance with an illustrative embodiment.

Referring now to the figures and, in particular, with reference to FIG. 1, an illustration of an event management system is depicted in the form of a block diagram in accordance with an illustrative embodiment. Event management system 100 may be used to manage plurality of events 102. Plurality of events 102 may relate to entity 104.

In some illustrative examples, entity 104 may be a single, indivisible entity. In other illustrative examples, entity 104 may be comprised of plurality of sub-entities 106. For example, without limitation, entity 104 may take the form of person 108, organization 110, or some other type of entity. Organization 110 may take the form of a company, a corporation, a governmental agency, a group of people, a club, an athletic team, an educational institution, or some other type of entity.

As depicted, event management system 100 includes data storage 112, event manager 114, and user interface 116. Data storage 112 may be implemented in the form of hardware, firmware, software, or a combination thereof. In one illustrative example, data storage 112 includes number of databases 118. As used herein, a "number of" items may include one or more items. In this manner, number of databases 118 may include one or more databases.

In other illustrative examples, data storage 112 may take the form of a server system comprising one or more servers. In still other illustrative examples, data storage 112 may take the form of associative memory.

Event manager 114 may be in communication with data storage 112. Event manager 114 may be implemented using software, hardware, firmware, or a combination thereof. When software is used, the operations performed by event manager 114 may be implemented using, for example, without limitation, program code configured to run on a processor unit. When firmware is used, the operations performed by event manager 114 may be implemented using, for example, without limitation, program code and data and stored in persistent memory to run on a processor unit.

When hardware is employed, the hardware may include one or more circuits that operate to perform the operations performed by event manager 114. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, event manager 114 may be implemented using computer system 120. Depending on the implementation, data storage 112 may be implemented as part of or separate from computer system 120.

User interface 116 may be in communication with event manager 114. In some cases, user interface 116 may also be in communication with data storage 112. User interface 116 may enable a user, such as user 117, to interact with event manager 114. Further, user interface 116 may enable event manager 114 to present information to user 117.

In one illustrative example, user interface 116 takes the form of graphical user interface 122. Graphical user interface 122 may be configured for display on display system 124. Display system 124 may include one or more display devices. In some illustrative examples, display system 124 may take the form of a touch screen.

Depending on the implementation, display system 124 may be implemented as part of or separate form computer system 120. In one illustrative example, display system 124 may be implemented as part of user device 126. User device 126 may take the form of, for example, without limitation, a desktop computer, a laptop, a tablet, a laptop-tablet hybrid, a notebook, an ultra-book, a smartphone, or some other type of device. In other illustrative examples, display system 124 may include multiple display devices on multiple user devices, each of which may be used for displaying a different graphical user interface.

Data storage 112, event manager 114, user device 126, or some combination thereof may be connected to network 128. Network 128 may be a communications network that takes the form of, for example, without limitation, a wireless network. In one illustrative example, network 128 may include the Internet.

Data storage 112 is used to store information 130 related to plurality of events 102. Information 130 may include, for example, without limitation, event data 134 for each of plurality of events 102. Event data 134 may be received from one or more sources. Event data 134 for an event, such as event 135, may be received from, for example, without limitation, user input received through user interface 116 from user device 126, data retrieved from one or more servers, data mined from a number of resources, other types of sources, or some combination thereof.

Information 130 also includes timeline 136 for plurality of events 102. Timeline 136 may be generated by event manager 114 using event data 134. Timeline 136 may be a chronological organization of plurality of events 102. Timeline 136 may take the form of dynamic timeline 138 because timeline 136 may change as new event data is received, processed by event manager 114, and stored in data storage 112.

In some illustrative examples, timeline 136 may include a plurality of sub-timelines for a plurality of categories of events. In other words, each of the plurality of sub-timelines may be for events in plurality of events 102 that fall within a particular category.

In one illustrative example, event manager 114 identifies time information that includes at least one of a date or a time for each of plurality of events 102 based on event data 134.

Event manager 114 may organize the time information to establish timeline 136, which may be updatable over time as new event data is received.

Event manager 114 uses event data 134 for plurality of events 102, timeline 136, and set of policies 140 to identify set of event chains 141. Each event chain in set of event chains 141 may comprise events that are linked by some type of cause-and-effect relationship. Each policy in set of policies 140 may include at least one of rules, algorithms, processes, parameters, instructions, or some other type of information that may be used to identify set of event chains 141.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

In one illustrative example, event data 134 for plurality of events 102, timeline 136, and set of policies 140 may be used to perform at least one of data mining 142, pattern recognition 144, event relationship identification 146, or inferential processing 147.

As event data 134 and other types of information are received by event manager 114, event manager 114 monitors for an occurrence of trigger 150 that is related to an event belonging to one of set of event chains 141. Trigger 150 may take a number of different forms. For example, without limitation, trigger 150 may comprise at least one of an occurrence of an event, a change to the event data for an event, receiving certain user input, a lapse of a timer, a change in a current location of user device 126, the current data reaching a preselected date, the current time reaching a preselected time, or some other type of trigger.

In response to event manager 114 detecting trigger 150, event manager 114 then identifies number of effects 152 of trigger 150. An example of one manner in which number of effects 152 may be identified is described in greater detail in FIG. 2 below.

Figure 2:
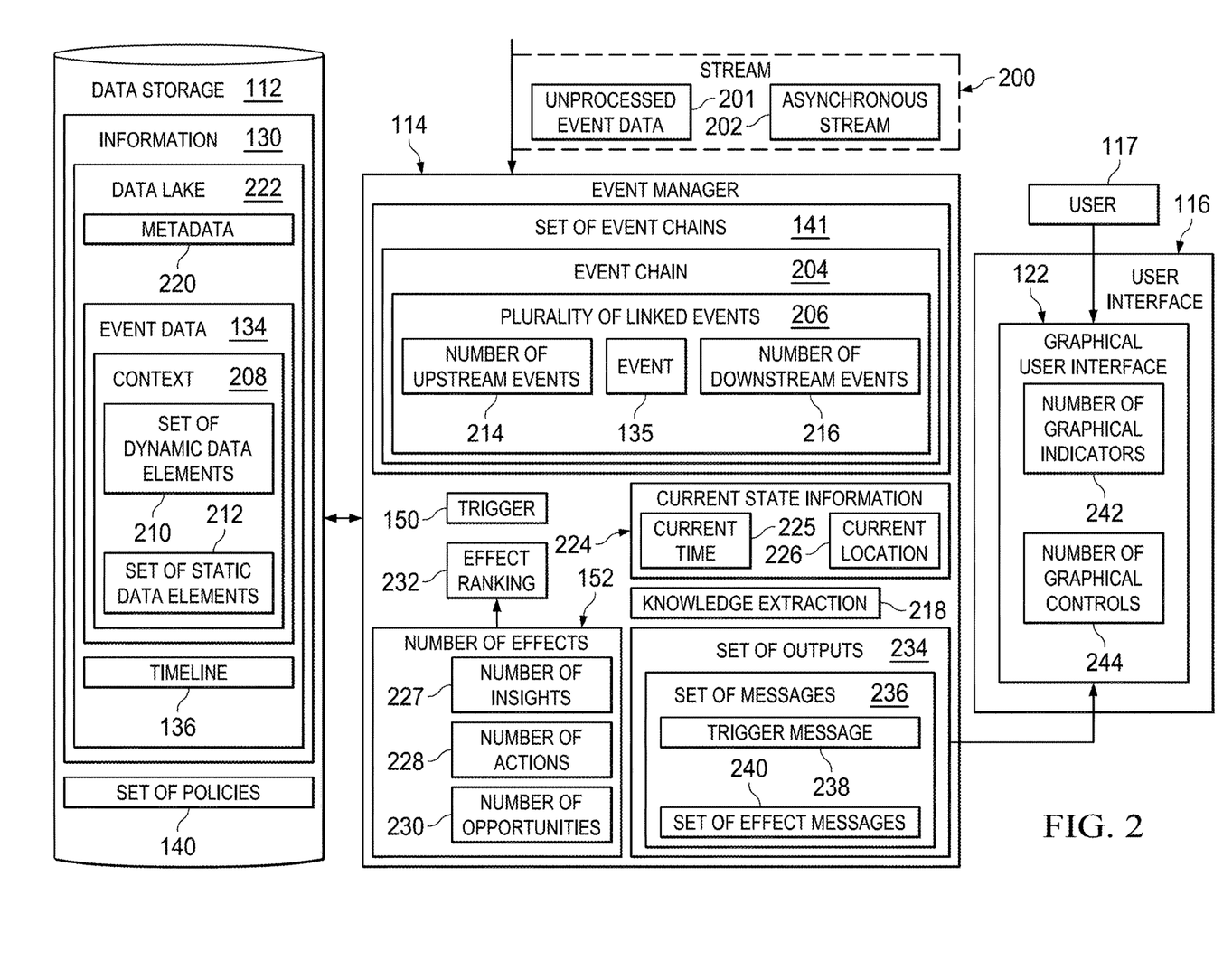
FIG. 2 is an illustration of an event manager, a data storage, and a graphical user interface in greater detail in the form of a block diagram in accordance with an illustrative embodiment.

With reference now to FIG. 2, an illustration of event manager 114, data storage 112, and graphical user interface 122 from FIG. 1 is depicted in greater detail in the form of a block diagram in accordance with an illustrative embodiment. In this illustrative example, event manager 114 receives stream 200 of unprocessed event data 201.

Stream 200 may be comprised of a series of data signals that are received at event manager 114 continuously, periodically, or in some other manner. In this illustrative example, stream 200 takes the form of asynchronous stream 202 of unprocessed event data 201.

Event manager 114 processes stream 200 of unprocessed event data 201 to generate event data 134 and timeline 136 that are then stored in data storage 112. Event data 134, timeline 136, and set of policies 140 may then be used to identify set of event chains 141. In one illustrative example, set of policies 140 may also be stored in data storage 112.

Event chain 204 is an example of one of set of event chains 141. As depicted, event chain 204 includes plurality of linked events 206. Each event in plurality of linked events 206 may be linked to at least one other event in plurality of linked events 206 by some type of relationship. In one illustrative example, this relationship may be a cause-and-effect relationship. For example, an occurrence of or change to one event may cause an effect related to another event.

Plurality of linked events 206 may be chronologically organized within event chain 204. This organization may be a sequential-type organization, a series-type organization, a tree-like organization, or some other type of organization.

Event 135 from FIG. 1 may be an example of one of plurality of linked events 206. Event 135 may have context 208. Context 208 includes set of dynamic data elements 210, set of static data elements 212, or both. A dynamic data element, such as one of set of dynamic data elements 210, may be a piece of data associated with event 135 that can be changed over time and changed any number of times without changing the overall context 208 of event 135. For example, when event 135 is a doctor's appointment, a dynamic data element may be the time of the appointment, the location of the appointment, or the doctor.

Conversely, a static data element, such as one of set of static data elements 212, may not be changed without changing the overall context 208 of event 135. For example, when event 135 is an employee arrival time at work, a static data element may be the name of the employee.

Plurality of linked events 206 may also include number of upstream events 214, number of downstream events 216, or both. Number of upstream events 214 includes one or more events that are earlier in time with respect to event 135. Number of downstream events 216 includes one or more events that are later in time with respect to event 135. Number of downstream events 216 may branch out from event 135 in tree-like form or may link to event 135 in the form of a line-series, depending on the implementation.

In some illustrative examples, event manager 114 may perform knowledge extraction 218 to generate event data 134, timeline 136, metadata 220, or a combination thereof. Metadata 220 may include, for example, without limitation, data about entity 104 in FIG. 1, timestamp data, date information, subject matter data, location data, or some combination thereof.

In one illustrative example, information 130 that includes event data 134, timeline 136, and metadata 220 may be stored in the form of data lake 222. Data lake 222 may be a multi-dimensional semantic network derived from event data 134, timeline 136, and metadata 220.

When event manager 114 detects trigger 150, event manager 114 may use data lake 222 and current state information 224 to identify number of effects 152 of trigger 150. Current state information 224 may include, for example, without limitation, at least one of current time 225, current location 226, or some other type of information about the current state with respect to event manager 114 or user device 126 in FIG. 1.

As depicted, number of effects 152 may include at least one of number of insights 227, number of actions 228, number of opportunities 230. An insight, such as one of number of insights 227, may be an observation, an inference, or some other type of piece of knowledge or wisdom based on trigger 150. As one illustrative example, trigger 150 may be an employee signing up to participate in a project at work. A corresponding insight for trigger 150 may be the observation that a total of ten people have now signed up for this project.

An action, such as one of number of actions 228 may be an operation or task that is performed in response to trigger 150. As one illustrative example, when trigger 150 is an employee signing up to participate in a project at work, a corresponding action for this trigger 150 may be the automatic sending of an email containing an information packet attachment detailing the project to the employee.

An opportunity, such as one of number of opportunities 230, may be an opportunity for user 117 to perform some task. As one illustrative example, when trigger 150 is an employee signing up to participate in a project at work, a corresponding opportunity may be the opportunity for the employee to optionally sign up for a certification training related to the project.

In some cases, once number of effects 152 of trigger 150 has been identified, event manager 114 may create effect ranking 232 for number of effects 152. Effect ranking 232 may be a ranking based on at least one of a date and time associated with each effect, a person or entity associated with each effect, priorities selected by user 117, or some other type of factor.

In one illustrative example, when number of effects 152 includes multiple effects, two or more of these effects may form a chain of effects. For example, without limitation, an insight that is identified based on trigger 150 may, in turn, trigger an opportunity or an action. In some cases, an action that is performed in response to the occurrence of trigger 150 may, in turn, trigger multiple opportunities, multiple insights, or both. In this manner, event manager 114 may be capable of identifying a chain of effects that stem from trigger 150. This chain of effects may take the form of a linear-type chain of effects or a tree-type chain of effects.

After identifying number of effects 152 for trigger 150, event manager 114 may generate set of outputs 234 for communicating at least one of number of effects 152 to user 117. Set of outputs 234 may be sent to and output through user interface 116.

In one illustrative example, set of outputs 234 takes the form of set of messages 236. Set of messages 236 may be visually presented to user 117 through graphical user interface 122. As depicted, set of messages 236 may include trigger message 238 and set of effect messages 240. Trigger message 238 may be a message about trigger 150. For example, without limitation, trigger message 238 may simply be a notification that trigger 150 was detected or that trigger 150 has occurred. Set of effect messages 240 may include a message corresponding to at least one of number of effects 152.

In some illustrative examples, event manager 114 may also display number of graphical indicators 242, number of graphical controls 244, or both in graphical user interface 122. In one illustrative example, number of graphical indicators 242, number of graphical controls 244, or both may be associated with set of messages 236.

For example, a graphical indicator may take the form of a label of a selected color, a graphical symbol, highlighted text, or some other type of graphical indicator within one of set of messages 236. A graphical control may take the form of, for example, without limitation, a button, a checkbox, or some other type of graphical control within a message. As one illustrative example, a message corresponding to an opportunity of number of opportunities 230 may include a button asking user 117 to take the opportunity.

Figure 3:
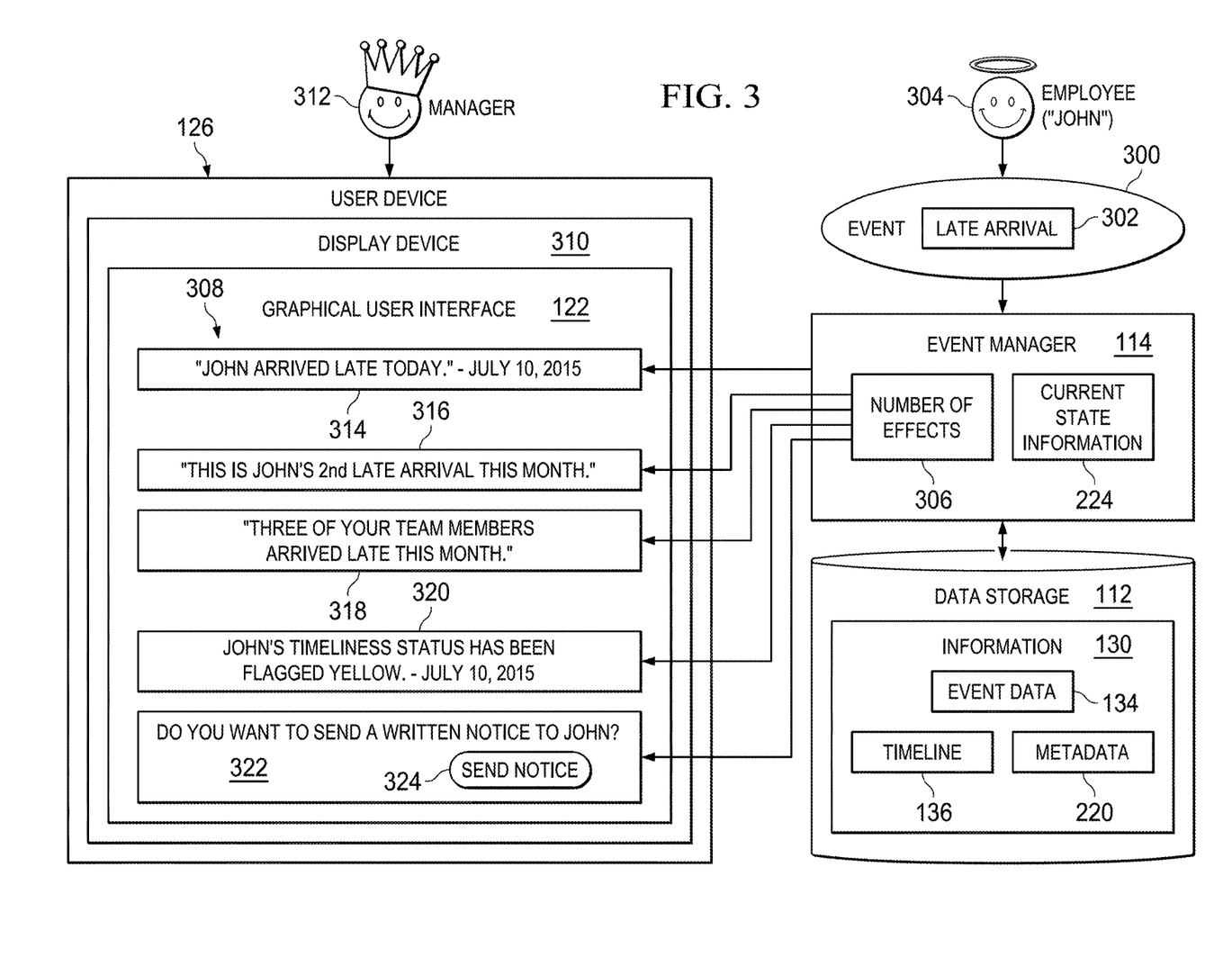
FIG. 3 is an illustration of different types of messages that may be generated by an event manager in the form of a block diagram in accordance with an illustrative embodiment.

With reference now to FIG. 3, an illustration of different types of messages that may be generated by event manager 114 from FIGS. 1-2 is depicted in the form of a block diagram in accordance with an illustrative embodiment. Event 300 may be an example of one type of trigger 150 from FIG. 1.

As depicted, event 300 may be late arrival 302 of employee 304. In response to detecting the occurrence of event 300, event manager 114 uses information 130 and, in some cases, current state information 224, to identify number of effects 306.

Event manager 114 may then generate set of messages 308 based on number of effects 306. Event manager 114 displays set of messages 308 on display device 310 of user device 126. Display device 310 may be an example of one implementation for display system 124 in FIG. 1. User device 126, in this illustrative example, belongs to manager 312.

Set of messages 308 include message 314, message 316, message 318, message 320, and message 322. Message 314 may be an example of trigger message 238 in FIG. 2. Message 314 identifies the trigger as late arrival 302 of employee 304.

Each of message 316, message 318, message 320, and message 322 is an example of one of set of effect messages 240 in FIG. 2. Message 316 communicates an insight to manager 312 generated by event manager 114 based on late arrival 302 of employee 304. This insight may be an example of one of number of insights 227 in FIG. 2. In this illustrative example, the insight is the observation that late arrival 302 is the second late arrival of employee 304.

Message 318 communicates another insight to manager 312 generated by event manager 114 based on late arrival 302 of employee 304. This insight, which may be another example of one of number of insights 227 in FIG. 2, is an observation that late arrival 302 of employee 304 makes a total of three team members that arrived late this month.

Message 320 communicates an action to manager 312 that has been taken based on late arrival 302 of employee 304. This action is an example of one of number of actions 228 in FIG. 2. In this illustrative example, the action taken is the flagging of a timeliness status for employee 304.

Further, message 322 communicates an opportunity to manager 312 recognized by event manager 114 based on late arrival 302 of employee 304. This opportunity may be an example of one of number of opportunities 230 in FIG. 2. In this illustrative example, the opportunity is a chance for manager 312 to send a written notice to employee 304. As depicted, button 324 is associated with message 322. Button 324 may be an example of one implementation for one of number of graphical controls 244 in FIG. 2. Button 324 enables manager 312 to take advantage of the opportunity presented. In this manner, number of effects 306 of a trigger, such as trigger 150 in FIGS. 1-2, may be communicated to a user, such as user 117 in FIGS. 1-2, in a number of different ways.

The illustrations in FIGS. 1-3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
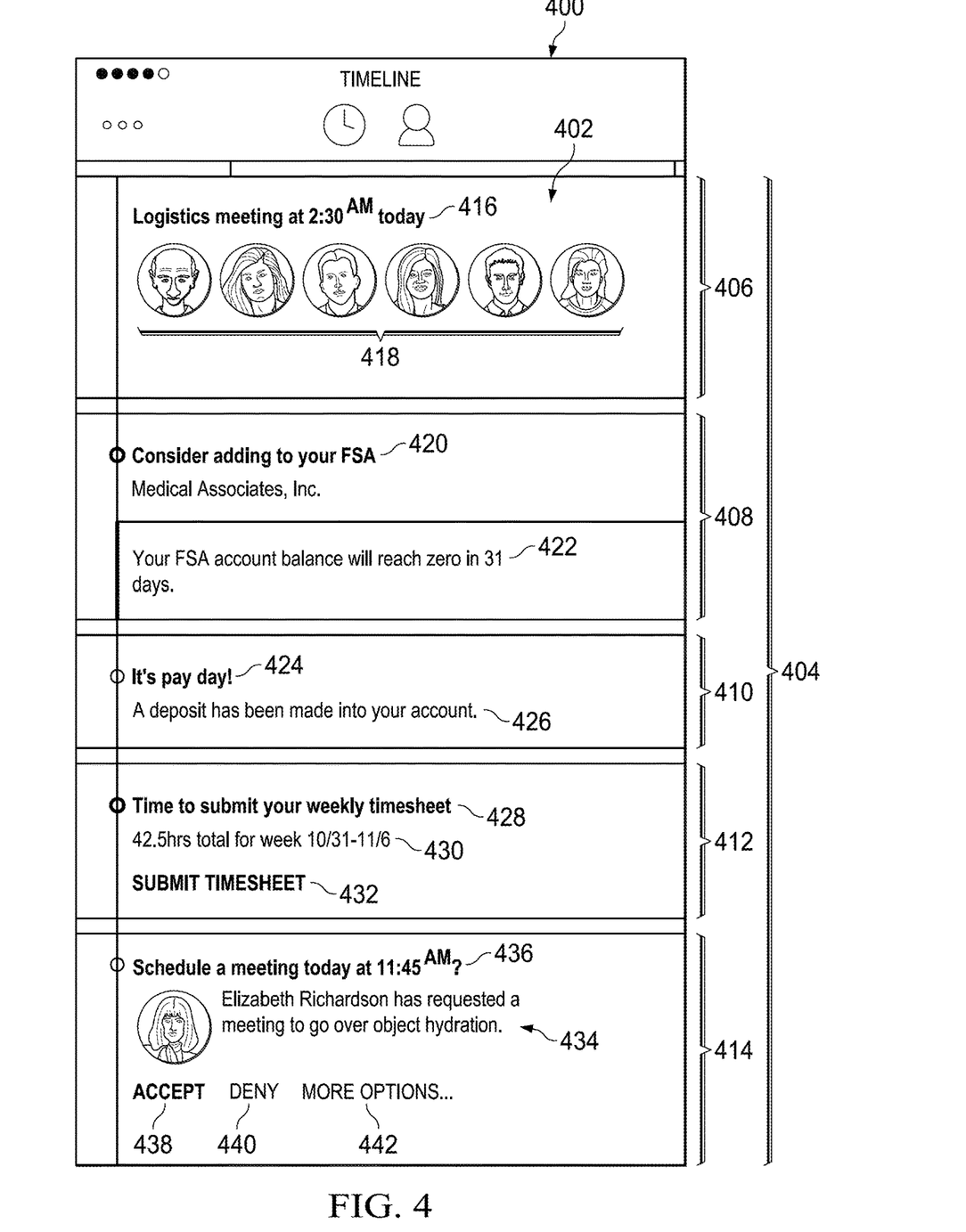
FIG. 4 is an illustration of a graphical user interface in accordance with an illustrative embodiment.

With reference now to FIG. 4, an illustration of a graphical user interface is depicted in accordance with an illustrative embodiment. In this illustrative example, graphical user interface 400 may be an example of one type of graphical user interface that may be displayed on, for example, without limitation, a smartphone, a tablet, a laptop, or some other type of data processing system.

Further, graphical user interface 400 may be an example of one implementation for graphical user interface 122 in FIG. 1. Graphical user interface 400 may be controlled by an event manager, such as event manager 114 in FIG. 1.

As depicted, timeline 402 is displayed in graphical user interface 400. Timeline 402 includes plurality of items 404. Each item of plurality of items 404 may include a visual presentation of at least one of an event, an insight, an action, an opportunity, or another type of effect.

For example, plurality of items 404 includes items 406, 408, 410, 412, and 414. Item 406 includes trigger message 416 and images 418 displayed in association with trigger message 416. Trigger message 416 identifies that a meeting is scheduled to occur later in the day. This meeting may be an example of one implementation for event 135 in FIGS. 1 and 2.

The event manager may be preconfigured to detect when the meeting is scheduled to occur one hour before a current time. This detection may be considered a trigger. In response to this trigger, the event manager generates and displays trigger message 416. Further, the event manager identifies an effect based on this trigger. This effect may be an action to display the people who are scheduled to attend the meeting in graphical user interface 400. Images 418 identify these people.

In this illustrative example, opportunity message 420 and insight message 422 are displayed as item 408. Insight message 422 and opportunity message 420 may be an example of one implementation for set of effect messages 240 in FIG. 2. These messages may be generated based on the detection of a trigger. For example, the current date and time together with an account balance being below a selected value may be detected as a trigger. The event manager may use information about the account, the current date and time, and past spending history to generate insight message 422, identifying an insight based on this trigger. This insight may be that the balance of that account will reach zero in 31 days.

Opportunity message 420 is generated based on the insight identified by insight message 422. In this manner, the insight identified by insight message 422 and the opportunity identified by opportunity message 420 form a chain of effects. Opportunity message 420 is displayed in graphical user interface 400 to present the opportunity to a user for the user to take action based on the insight identified by insight message 422.

As depicted, item 410 includes insight message 424 and trigger message 426. Trigger message 426 identifies an event, which, in this illustrative example, is a deposit of money into an account. The event manager may detect this deposit as a trigger and may identify an insight corresponding to the deposit. The insight may be based on, for example, information about the source of the money deposited, the amount deposited, the deposit date, or some combination thereof. Insight message 424 identifies this insight.

Item 412 includes insight message 428, insight message 430, and opportunity control 432. In this example, the current date and time may be a triggering event. Based on this triggering event, the event manager identifies two insights, which may be that it is time to submit a timesheet and a total hours worked to date. Insight message 428 and insight message 430 identify these two insights, respectively.

Further, the event manager identifies an opportunity based on the two insights. The opportunity may be the option to submit a timesheet. Opportunity control 432 is a graphical control that presents this opportunity to the user.

Item 414 includes trigger message 434 and opportunity message 436. Tigger message 434 identifies a triggering event, which is the receiving of a request for a meeting. Opportunity message 436 identifies an opportunity identified by the event manager based on the detection of the trigger. This opportunity may be the option to schedule the meeting for a particular date and time. Graphical control 438, graphical control 440, and graphical control 442 are displayed to present options for the user to accept the opportunity, deny the opportunity, or view more options regarding the opportunity, respectively.

Figure 5:
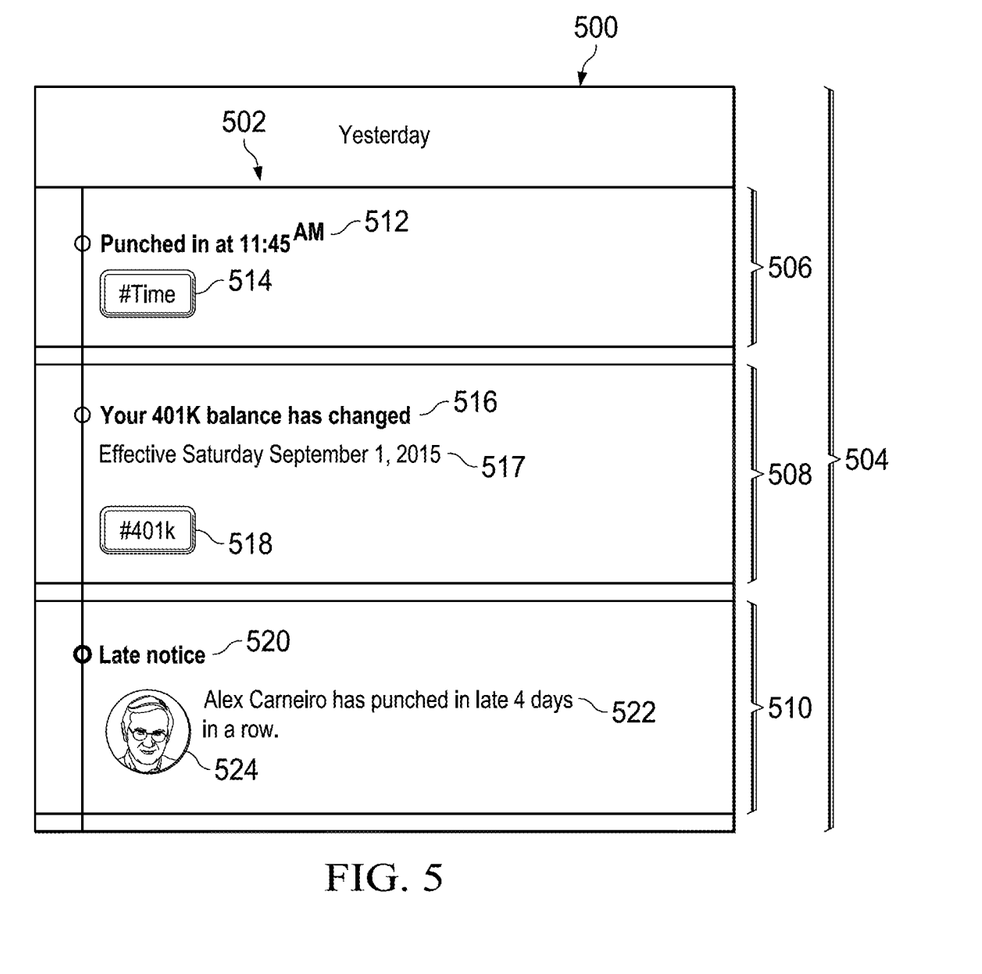
FIG. 5 is an illustration of a graphical user interface in accordance with an illustrative embodiment.

With reference now to FIG. 5, an illustration of a graphical user interface is depicted in accordance with an illustrative embodiment. In this illustrative example, graphical user interface 500 may be an example of one type of graphical user interface that may be displayed on, for example, without limitation, a smartphone, a tablet, a laptop, or some other type of data processing system.

Further, graphical user interface 500 may be an example of one implementation for graphical user interface 122 in FIG. 1. Graphical user interface 500 may be controlled by an event manager, such as event manager 114 in FIG. 1.

As depicted, timeline 502 is displayed in graphical user interface 500. Timeline 502 includes plurality of items 504. Each item of plurality of items 504 may include a visual presentation of at least one of an event, an insight, an action, an opportunity, or another type of effect.

As depicted, item 506 includes trigger message 512 and opportunity control 514. Trigger message 512 identifies a trigger that has been detected, which is that the user has punched into an employee time clock system. Opportunity control 514 presents an opportunity for the user to view a total hours worked by the user that week.

Item 508 includes trigger message 516 and opportunity control 518. Trigger message 516 identifies a trigger that has been detected, which is that a savings account balance of the user has changed. Opportunity control 518 presents an opportunity for the user to view this account balance.

Item 510 includes trigger message 520, insight message 522, and image 524. Trigger message 520 identifies a trigger that has been detected, which is late arrival of an employee. Insight message 522 identifies an insight that has been identified base on this trigger, which is that this employee now has four late arrivals in a row. Image 524 identifies the employee.

In this manner, triggering events and insights may be displayed and presented to a user on a graphical user interface in a number of different ways. Any number of images, graphical indicators, graphical controls, or combination thereof may also be displayed on the graphical user interface.

Figure 6:
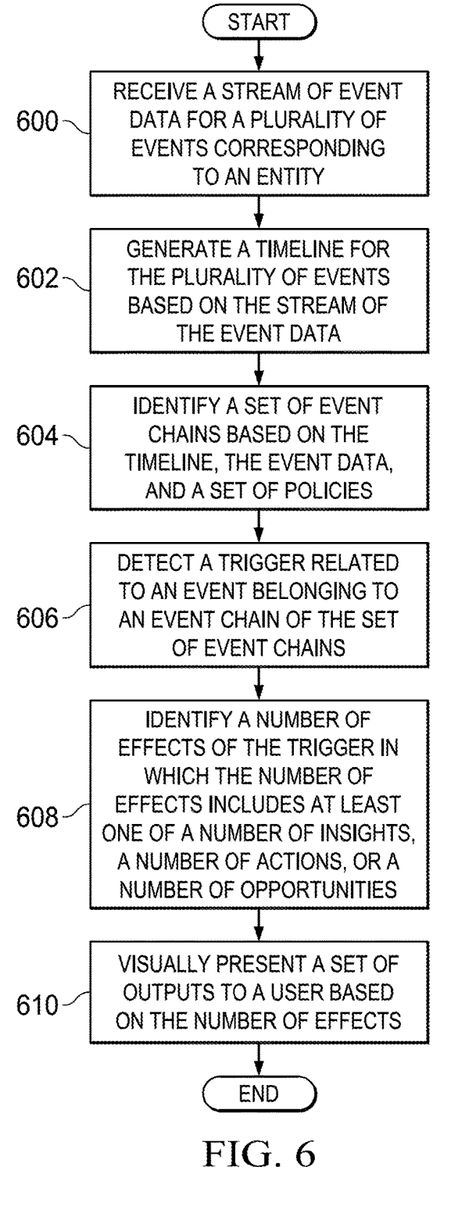
FIG. 6 is an illustration of a process for managing events in the form of a flowchart in accordance with an illustrative embodiment.

With reference now to FIG. 6, an illustration of a process for managing events is depicted in the form of a flowchart in accordance with an illustrative embodiment. The process illustrated in FIG. 6 may be implemented using event management system 100 in FIG. 1.

The process begins by receiving a stream of event data for a plurality of events corresponding to an entity (operation 600). A timeline is generated for the plurality of events based on the stream of the event data (operation 602). A set of event chains is then identified based on the timeline, the event data, and a set of policies (operation 604).

Thereafter, a trigger related to an event belonging to an event chain of the set of event chains may be detected (operation 606). A number of effects of the trigger may then be identified in which the number of effects includes at least one of a number of insights, a number of actions, or a number of opportunities (operation 608). A set of outputs based on the number of effects may then be visually presented to a user (operation 610), with the process terminating thereafter.

Figure 7:
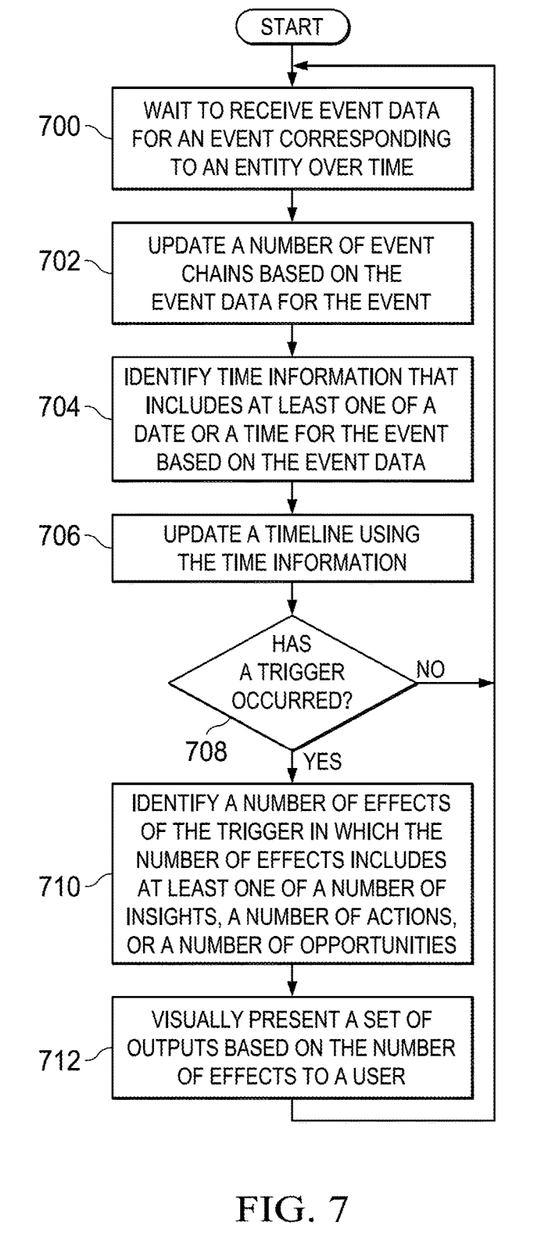
FIG. 7 is an illustration of a process for managing events in the form of a flowchart in accordance with an illustrative embodiment.

With reference now to FIG. 7, an illustration of a process for managing events is depicted in the form of a flowchart in accordance with an illustrative embodiment. The process illustrated in FIG. 7 may be implemented using event management system 100 in FIG. 1.

The process begins by waiting to receive event data for an event corresponding to an entity over time (operation 700). A number of event chains are updated based on the event data for the event (operation 702). In operation 702, the event may be linked to one or more other events in one or more event chains.

Next, time information that includes at least one of a date or a time for the event is identified based on the event data (operation 704). A timeline is updated using the time information (operation 706).

Thereafter, a determination is made as to whether a trigger has occurred (operation 708). In operation 708, this determination may be made based on the event data, the updated timeline, and current state information. The current state information may include, for example, at least one of a current time, a current location, or some other type of current information. If a trigger has not occurred, the process returns to operation 700 as described above.

However, if the trigger has occurred, a number of effects of the trigger may then be identified in which the number of effects includes at least one of a number of insights, a number of actions, or a number of opportunities (operation 710). A set of outputs based on the number of effects may then be visually presented to a user (operation 712), with the process then returning to operation 700 described above.

Figure 8:
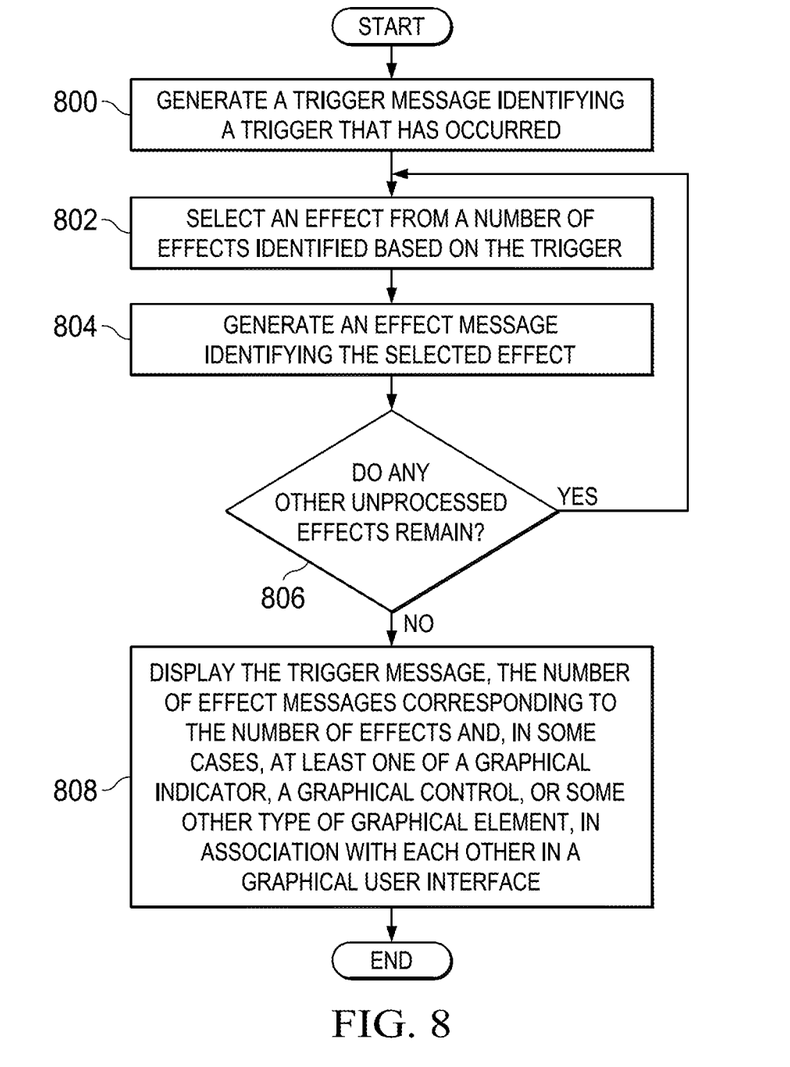
FIG. 8 is an illustration of a process for displaying a set of outputs in the form of a flowchart in accordance with an illustrative embodiment.

With reference now to FIG. 8, an illustration of a process for displaying a set of outputs is depicted in the form of a flowchart in accordance with an illustrative embodiment. The process illustrated in FIG. 8 may be implemented using event management system 100 in FIG. 1. In particular, this process may be an example of one manner in which operation 712 in FIG. 7 may be implemented.

A trigger message identifying a trigger that has occurred is generated (operation 800). In operation 800, the trigger may be, for example, without limitation, a trigger detected in operation 708 in FIG. 7. Next, an effect is selected from a number of effects identified based on the trigger (operation 802). In operation 802, the number of effects may be, for example, the number of effects identified in operation 710 in FIG. 7.

Next, an effect message identifying the selected effect is generated (operation 804). Thereafter, a determination is made as to whether any other unprocessed effects remain (operation 806). If any unprocessed effects remain, the process returns to operation 802 described above.

Otherwise, if no unprocessed effects remain, then a number of effect messages have been generated for the number of effects. The trigger message, the number of effect messages corresponding to the number of effects and, in some cases, at least one of a graphical indicator, a graphical control, or some other type of graphical element, are displayed in association with each other in a graphical user interface (operation 808), with the process terminating thereafter.

Figure 9:
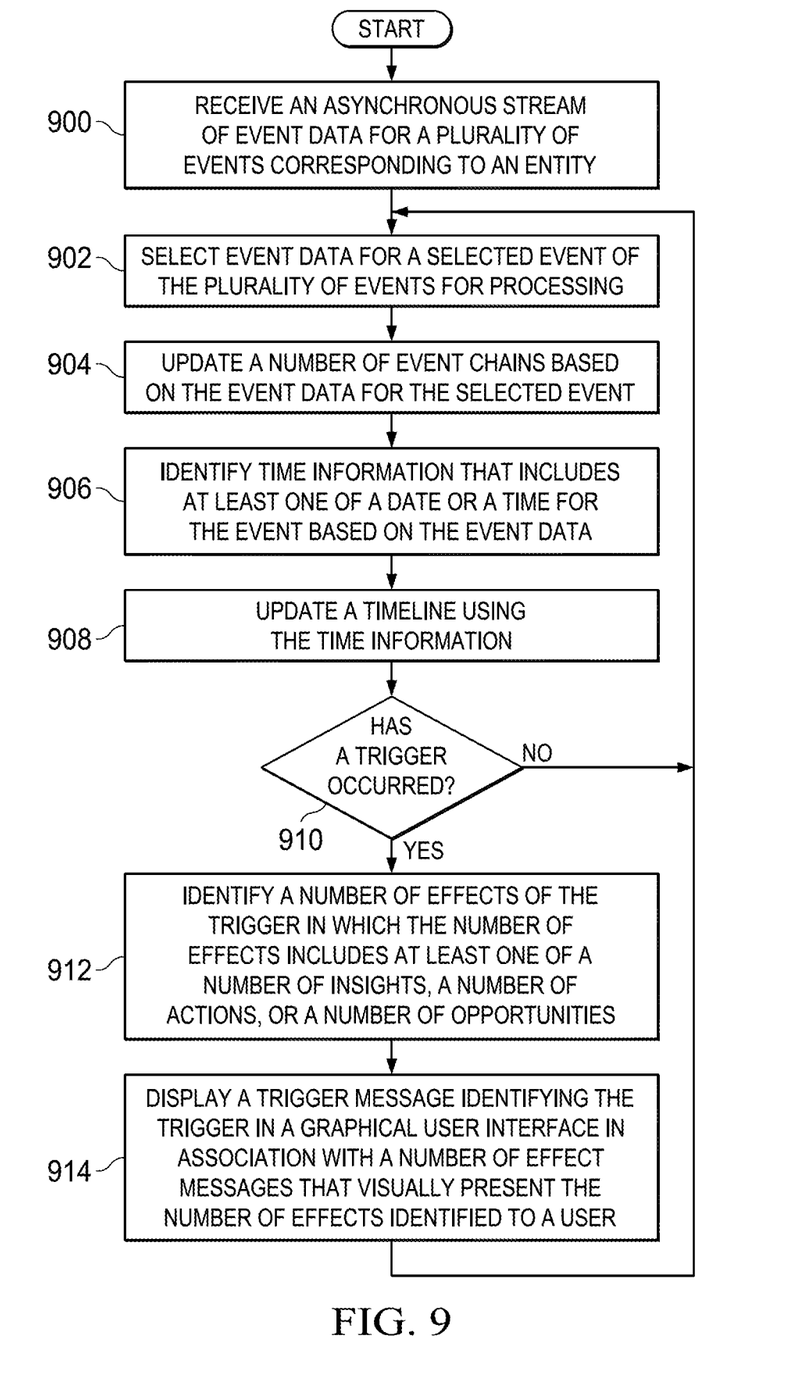
FIG. 9 is an illustration of a process for managing events in the form of a flowchart in accordance with an illustrative embodiment.

With reference now to FIG. 9, an illustration of a process for managing events is depicted in the form of a flowchart in accordance with an illustrative embodiment. The process illustrated in FIG. 9 may be implemented using event management system 100 in FIG. 1.

The process begins by receiving an asynchronous stream of event data for a plurality of events corresponding to an entity (operation 900). In operation 900, the entity may be a business entity. The plurality of events may include, for example, without limitation, employee-related events and employer-related events.

As operation 900 is performed over time, event data for a selected event of the plurality of events is selected for processing (operation 902). A number of event chains are updated based on the event data for the selected event (operation 904).

Next, time information that includes at least one of a date or a time for the event is identified based on the event data (operation 906). A timeline is updated using the time information (operation 908).

Thereafter, a determination is made as to whether a trigger has occurred (operation 910). In operation 910, this determination may be made based on the event data, the updated timeline, and current state information. If a trigger has not occurred, the process returns to operation 902 as described above.

However, if the trigger has occurred, a number of effects of the trigger may then be identified in which the number of effects includes at least one of a number of insights, a number of actions, or a number of opportunities (operation 912). In operation 912, at least one of pattern recognition, reinforcement learning, machine learning, user input, or some other type of process may be used to identify the number of effects. As one illustrative example, the user input may comprise a selection of a number of best patterns from multiple potential patterns for use in identifying the number of effects.

A trigger message identifying the trigger is displayed in a graphical user interface in association with a number of effect messages that visually present the number of effects identified to a user (operation 914), with the process then returning to operation 902 as described above. In some cases, in operation 914, a number of graphical indicators, a number of graphical controls, or both may be displayed in association with the number of effect messages. In one illustrative example, in operation 914, the trigger message and the number of effect messages may be displayed in association with a graphical timeline in the graphical user interface.

In one illustrative example, the graphical timeline may be displayed independently or as part of a digital calendar. Text, messages, graphical elements, or some combination thereof representing past and future events may be displayed along the graphical timeline. The trigger message and the number of effect messages may be displayed at a position along the graphical timeline that may allow the user to gain additional insight based on viewing the graphical timeline. Particularly, viewing the trigger message and the number of effect messages positioned along the graphical timeline with respect to past and future events also identified along the graphical timeline may enable a user to zero in on a particular chain of events or chain of effects of a trigger. A filter may also be used to help the user further zero in on a particular chain of events or chain of effects of a trigger related to a particular subject.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
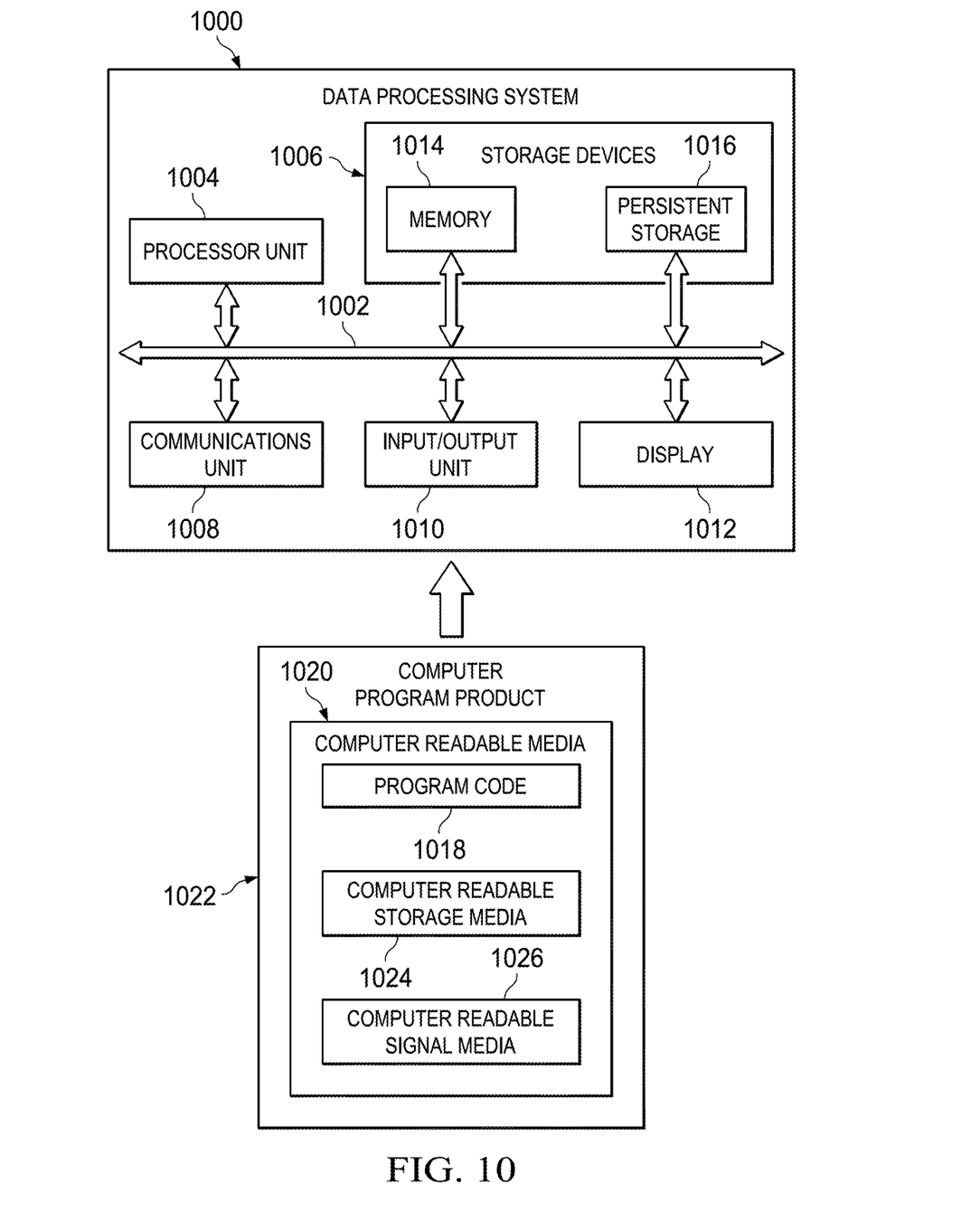
FIG. 10 is an illustration of a data processing system in the form of a block diagram in accordance with an illustrative embodiment.

Turning now to FIG. 10, an illustration of a data processing system in the form of a block diagram is depicted in accordance with an illustrative embodiment. Data processing system 1000 may be used to implement computer system 120 in FIG. 1. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising
a data processing system comprising one or more processors, coupled with memory, to:
receive, over a network, a stream of event data from one or more devices remote from the data processing system;
generate a timeline of events including at least one event of the stream of event data;
identify, based on the timeline of events and a set of policies, a set of event chains, a first event chain of the set of event chains including a plurality of temporally linked events of the stream of event data;
detect a trigger event within the first event chain of the set of event chains;
determine, based on i) a data lake including a multi-dimensional semantic network of the event data and ii) state information including at least a current time, a set of effects associated with the trigger event, wherein the set of effects includes at least an actionable task;
cause generation of a graphical control associated with the trigger event, the timeline, and the set of effects including at least the actionable task;
provide the graphical control for display via a graphical user interface; and
initiate, subsequent to the graphical control provided for display via the graphical user interface and responsive to a selection of the graphical control, execution of the actionable task associated with the trigger event.

2. The system of claim 1, wherein the data processing system is further configured to:
receive an asynchronous stream of unprocessed data signals for a plurality of events related to an entity; and
identify, based on the asynchronous stream of unprocessed data signals, the at least one event of the stream of event data.

3. The system of claim 1, wherein the data processing system is further configured to:
generate a plurality of insights, based on the trigger event, the first event chain, and a pattern of past events; and
provide the plurality of insights for display via the graphical user interface.

4. The system of claim 1, wherein the data lake comprises at least one of pattern recognition, reinforcement learning, or machine learning.

5. The system of claim 1, wherein the set of effects comprises a linear-type chain of effects.

6. The system of claim 1, wherein the set of effects comprises a tree-type chain of effects.

7. The system of claim 1, wherein each event of the stream of event data comprises a dynamic element and a static element.

8. The system of claim 1, wherein the set of event chains is identified using at least one of data mining, pattern recognition, event relationship identification, or inferential processing using the set of policies.

9. A method, comprising
receiving, by a data processing system comprising one or more processors coupled with memory, over a network, a stream of event data;
generating, by the data processing system, a timeline of events including at least one event of the stream of event data;
identifying, by the data processing system, based on the timeline of events and a set of policies, a set of event chains, a first event chain of the set of event chains including a plurality of temporally linked events of the stream of event data;
detecting, by the data processing system, a trigger event within the first event chain of the set of event chains;
determining, by the data processing system, based on i) a data lake including a multi-dimensional semantic network of the event data and ii) state information including at least a current time, a set of effects associated with the trigger event, wherein the set of effects includes at least an actionable task;

causing, by the data processing system, generation of a graphical control associated with the trigger event, the timeline, and the set of effects including at least the actionable task;

providing, by the data processing system, the graphical control for display via a graphical user interface; and initiating, by the data processing system, subsequent to providing the graphical control for display via the graphical user interface and responsive to a selection of the graphical control, execution of the actionable task associated with the trigger event.

10. The method of claim 9, comprising:

receiving, by the data processing system, an asynchronous stream of unprocessed data signals for a plurality of events related to an entity; and identifying, by the data processing system, based on the asynchronous stream of unprocessed data signals, the at least one event of the stream of event data.

11. The method of claim 9, comprising:

generating, by the data processing system, a plurality of insights including the insight, based on the trigger event, the first event chain, and a pattern of past events; and providing, by the data processing system, the plurality of insights for display via the graphical user interface.

12. The method of claim 9, wherein the data lake comprises at least one of pattern recognition, reinforcement learning, or machine learning.

13. The method of claim 9, wherein the set of effects comprises a linear-type chain of effects.

14. The method of claim 9, wherein the set of effects comprises a tree-type chain of effects.

15. A non-transitory computer-readable storage medium storing processor executable instructions that, when executed by one or more processors, cause the one or more processors to:

receive, over a network, a stream of event data;

generate, a timeline of events including at least one event of the stream of event data;

identify, based on the timeline of events and a set of policies, a set of event chains, a first event chain of the set of event chains including a plurality of temporally linked events of the stream of event data;

detect a trigger event within the first event chain of the set of event chains;

determine, based on i) a data lake including a multi-dimensional semantic network of the event data and ii) state information including at least a current time, a set of effects associated with the trigger event, wherein the set of effects includes at least an actionable task;

cause generation of a graphical control associated with the trigger event, the timeline, and the set of effects including at least the actionable task;

provide, the graphical control for display via a graphical user interface; and initiate, subsequent to providing the graphical control for display via the graphical user interface and responsive to a selection of the graphical control, execution of the actionable task associated with the trigger event.

16. The non-transitory computer-readable storage medium of claim 15, wherein the instructions further comprising instructions to:

receive an asynchronous stream of unprocessed data signals for a plurality of events related to an entity; and identify, based on the asynchronous stream of unprocessed data signals, the at least one event of the stream of event data.

* * * * *